United States Patent
Bareiss et al.

[11] Patent Number: 5,688,113
[45] Date of Patent: Nov. 18, 1997

[54] PISTON FOR A PISTON PUMP WITH A TWO PART INLET VALVE BODY

[75] Inventors: Alexander Bareiss, Goose Creek; Ron Angle, N. Charleston; Brian Johanek, Ladson, all of S.C.; Helmuth Wuest, Leonberg, Germany

[73] Assignee: Robert Bosch GmbH, Stuttgart, Germany

[21] Appl. No.: 754,832

[22] Filed: Nov. 22, 1996

Related U.S. Application Data

[63] Continuation of Ser. No. 492,647, Jun. 20, 1995, abandoned.

[30] Foreign Application Priority Data

Sep. 1, 1994 [DE] Germany ............... 44 31 130.3

[51] Int. Cl.⁶ .................................................. F04B 21/04
[52] U.S. Cl. .................... 417/549; 417/552; 137/541; 92/181 R
[58] Field of Search ............ 92/181 R; 91/422, 91/222; 417/552, 569, 549; 137/541; 251/356, 357

[56] References Cited

U.S. PATENT DOCUMENTS

| | | | |
|---|---|---|---|
| 588,256 | 8/1897 | Wilson | 91/422 |
| 742,940 | 11/1903 | Whitaker | 137/541 |
| 1,294,014 | 2/1919 | Worster | 137/533 |
| 1,665,046 | 4/1928 | Tucker | 91/222 |
| 3,654,834 | 4/1972 | Sifri et al. | 91/422 |
| 4,766,927 | 8/1988 | Conatser | 137/541 |
| 5,407,333 | 4/1995 | Lambright | 417/514 |
| 5,588,817 | 12/1996 | Zirps et al. | 417/549 |

FOREIGN PATENT DOCUMENTS

| | | |
|---|---|---|
| 1218349 | 5/1960 | France . |
| 3808901 | 10/1989 | Germany . |

*Primary Examiner*—Thomas E. Denion
*Attorney, Agent, or Firm*—Edward E. Greigg; Ronald E. Greigg

[57] ABSTRACT

The invention relates to a piston, through which a fluid can flow, for a piston pump, which piston has a longitudinal bore into which a spring-loaded inlet valve body is inserted. In order to be able to bring a helical compression spring, which loads the inlet valve body, to bear against an annular shoulder in the longitudinal bore and to be able to check and if necessary improve its seating after installation, the invention proposes to produce the inlet valve body in two parts comprising the inlet valve disk and the inlet valve stem and to join these two parts to one another after the helical compression spring has been correctly inserted into the piston. The inlet valve disk can for example be joined to the inlet valve stem by ultrasonic welding, thermoplastic riveting or screwing.

26 Claims, 2 Drawing Sheets

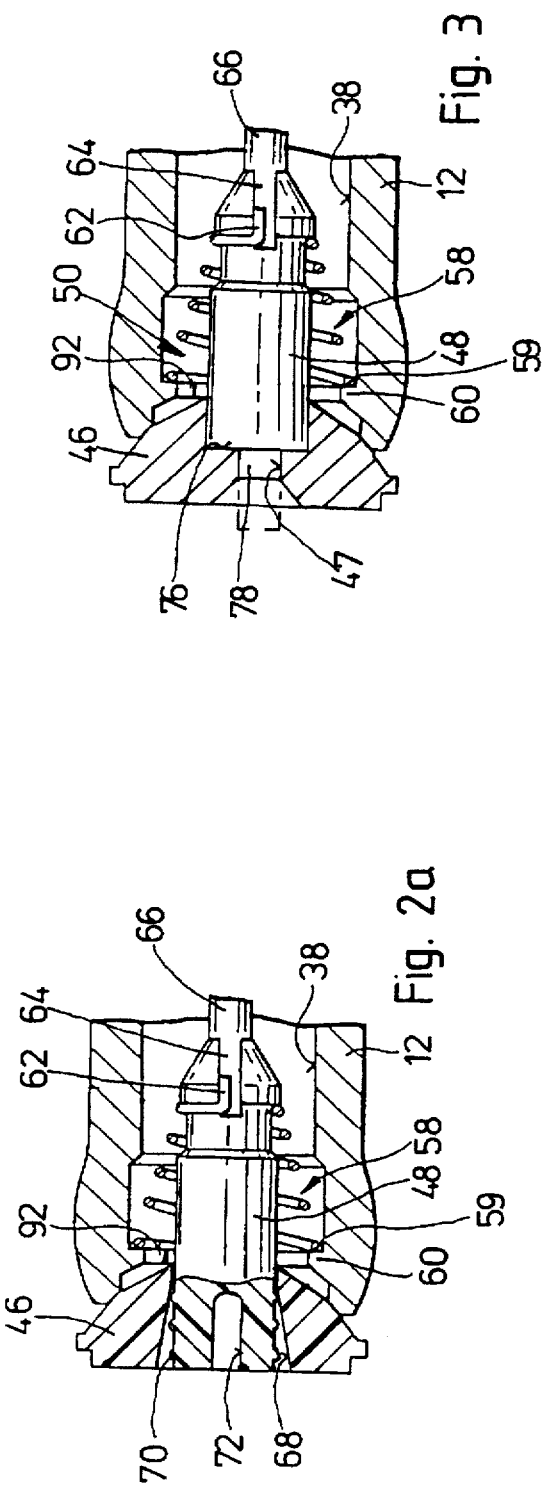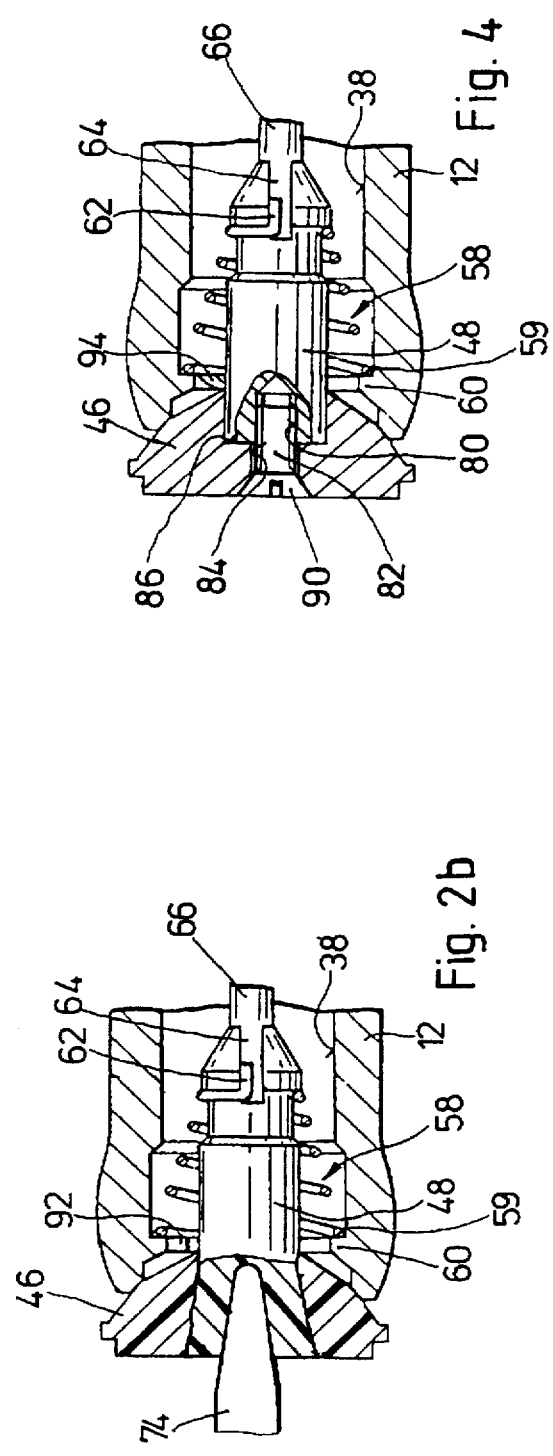

5,688,113

1

PISTON FOR A PISTON PUMP WITH A TWO PART INLET VALVE BODY

This is a continuation of application Ser. No. 08/492,647 filed on Jun. 20, 1995 now abandoned.

PRIOR ART

The invention relates to a piston, through which a fluid can flow, for a piston pump which has an inlet valve arranged in the piston, as set forth hereinafter.

In German Patent Application P 43 20 902.5 a piston pump is described which has a piston of this type having a longitudinal bore through which a fluid can flow and into which an inlet valve body is inserted. An inlet valve disk is pressed sealingly by an inlet valve spring, which acts on an inlet valve stem integral with the inlet valve disk and is supported against an annular shoulder in the longitudinal bore of the piston, against an inlet valve seat which is situated on a front end face of the piston and leads into the longitudinal bore of the piston. The inlet valve spring is a conically coiled helical compression spring and is joined to the inlet valve stem for rotation therewith. The annular shoulder on which the inlet valve spring is supported has projections projecting radially inwards or an opening in the form of a helical flute to mount the inlet valve spring; the inlet valve body consisting of the inlet valve stem integral with the inlet valve disk is introduced, with the inlet valve stem foremost, into the longitudinal bore of the piston, while being turned at the same time. In this movement the inlet valve spring engages on the projections or in the helical flute-shaped opening of the annular shoulder and is "screwed in" by the turning movement until it lies with its widened end against a side of the annular shoulder facing away from the inlet valve seat.

This design and this mounting of the inlet valve has the disadvantage that during installation the inlet valve spring is masked by the inlet valve disk and therefore cannot be seen. Its seating on the annular shoulder cannot be checked after the inlet valve has been installed in the piston. This is so-called blind installation. This kind of installation results in a relatively high fault and failure rate.

ADVANTAGES OF THE INVENTION

In comparison therewith the piston according to the invention, which has a two-part inlet valve body consisting of the inlet valve stem and the inlet valve disk, has the advantage that the inlet valve stem together with the inlet valve spring can first be inserted into the longitudinal bore of the piston before the inlet valve disk is joined to the inlet valve stem. During insertion into the piston the inlet valve spring is not masked by the inlet valve disk, but can be seen and its seating on the annular shoulder in the longitudinal bore of the piston can be checked after installation. The inlet valve spring is also accessible from the front end face of the piston as long as the inlet valve disk has not yet been fitted onto the inlet valve stem. Correct seating of the inlet valve spring can be achieved before the inlet valve disk is fitted onto the inlet valve stem. Poor seating of the inlet valve spring resulting from incorrect installation can be very largely eliminated, so that failures of the piston according to the invention are avoided.

Through the welding or riveting of the inlet valve disk to the inlet valve stem a nondetachable connection is obtained, which even in continuous operation will not be detached by vibrational and shock loads.

Thermoplastic riveting or ultrasonic welding of the inlet valve disk to the inlet valve body enables a durable connection of this kind to be made in a simple manner and inexpensively. The inlet valve stem and/or the inlet valve disk consist in this case of a thermoplastic material. A light inlet valve body is obtained.

BRIEF DESCRIPTION OF THE DRAWINGS

The drawing shows exemplary embodiments of the invention, with the aid of which the invention is explained in greater detail in the following description. In the drawing:

FIG. 2a shows an inlet valve disk before it is ultrasonically welded to an inlet valve stem of the piston shown in FIG. 1, FIG. 2b shows the connection subsequent to having been welded;

FIG. 3 shows the thermoplastic riveting of an inlet valve disk to an inlet valve stem of the piston shown in FIG. 1, and FIG. 4 shows the screw connection of an inlet valve disk to an inlet valve stem of the piston shown in FIG. 1.

DETAILED DESCRIPTION OF THE EXEMPLARY EMBODIMENTS

Figure 1:
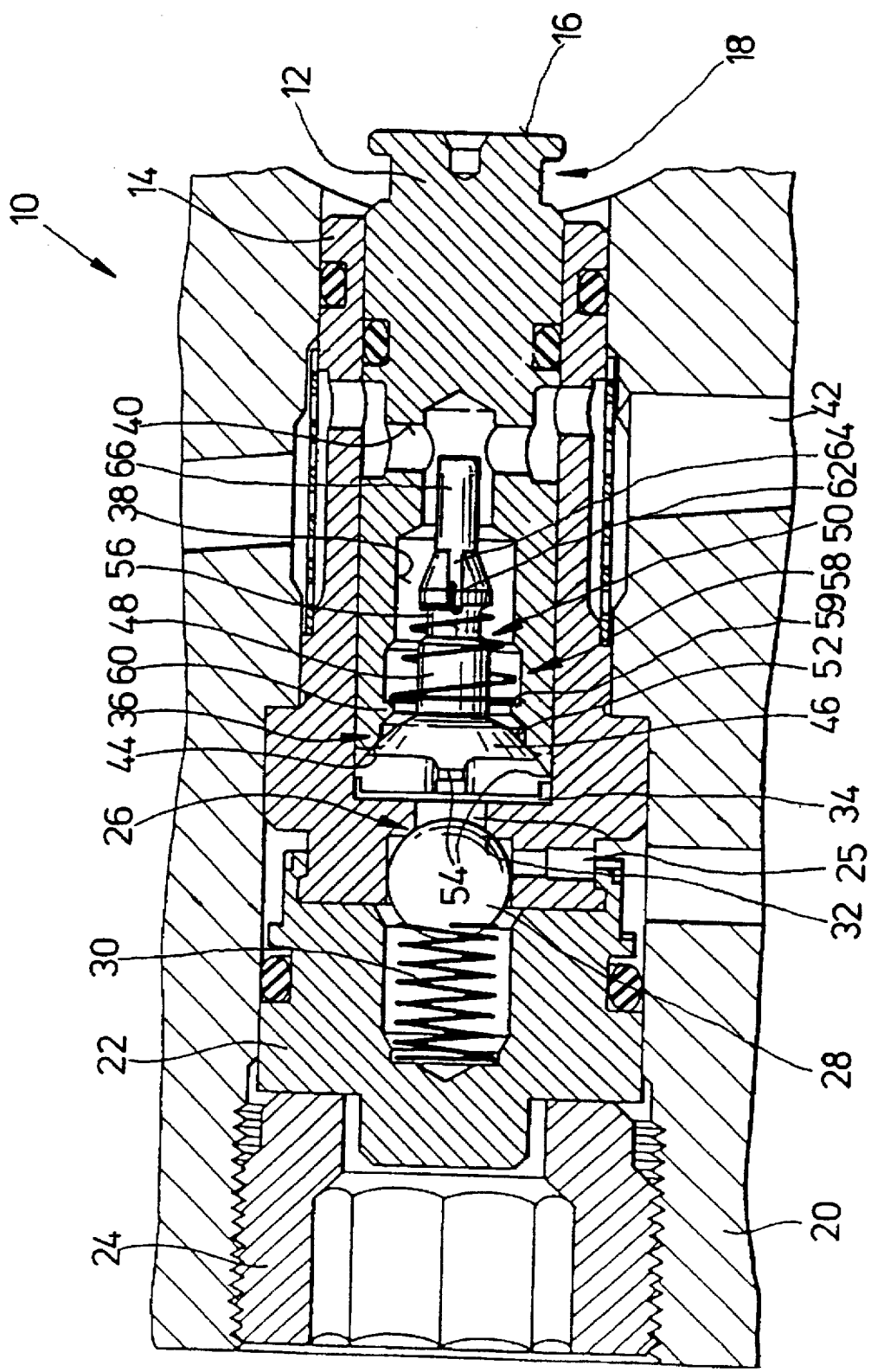
FIG. 1 shows a longitudinal section through a piston pump having a piston according to the invention.

The piston pump 10 shown in FIG. 1 is intended for a slip-controlled brake system (ABS) for motor vehicles. It has a piston 12 guided longitudinally in a cylinder 14. For the purpose of driving the piston 12 a rotationally drivable eccentric (not shown) is provided, a peripheral surface of which presses against an outer or rear end face 16 of the piston 12 and pushes the latter into the cylinder 14 for a working stroke. A circumferential groove 18 on a rear end, projecting out of the cylinder 14, of the piston 12 is provided for the engagement of a spring element, which is likewise not shown and which pulls the piston 12 out of the cylinder 14 for an induction stroke and holds the piston 12 bearing against the eccentric.

The cylinder 14 is inserted into a casing 20 of a hydraulic unit of a slip-control installation. At its front end remote from the piston drive it is closed by a closure cap 22. The cylinder 14 is held in the casing 20 by means of a screw-in stopper 24.

In a pump outlet 25 is arranged a nonreturn valve 26 provided with a valve ball 28 pressed sealingly, by a helical spring 30 supported against the closure cap 22, against a valve seat 32 facing away from a pump chamber 34.

The piston 12 has an inlet valve 36, which is likewise in the form of a nonreturn valve. For this purpose said piston is provided with a stepped longitudinal bore 38 starting from its front end face situated in the cylinder 14 and ending approximately in the middle of the piston. The longitudinal bore 38 is in communication with a pump inlet 42 via a transverse bore 40 at the end of the longitudinal bore 38 in the interior of the piston. At the front end face of the piston 14 the longitudinal bore 38 leads out via a conical valve seat 44 into the pump chamber 34.

An inlet valve body 50 consisting of an inlet valve disk 46 and an inlet valve stem 48 is received in the longitudinal bore 38 of the piston 12. The inlet valve disk 46 has a sealing surface 52 having the shape of a spherical segment and also four guide projections 54 which are arranged radially and are situated in front of the front end face of the piston 12 and by means of which the inlet valve body 50 is guided and centered in the cylinder 14.

The inlet valve stem 48 projects into the longitudinal bore 38 of the piston 12 without touching the piston 12. The valve stem has a constriction 56 with which an approximately conically coiled helical compression spring 58 engages by its end of smaller diameter. By its end of larger diameter the helical compression spring 58 is supported against an annular shoulder 59, which is formed by a side, facing away from the valve seat 44, of an inwardly projecting flange 60 in the longitudinal bore 38 of the piston 12. The flange 60 is situated closer to the front end of the piston 12 than the constriction 56, so that the sealing surface 52 of the inlet valve disk 46 is held in sealing contact with the valve seat 44 of the piston 12 by means of the helical compression spring 58. The annular shoulder 59 may also be formed in a different way, for example by means of a circlip which is inserted into a groove cut in the longitudinal bore 38 (not illustrated).

An end portion 62 bent over in the longitudinal direction at the end of smaller diameter of the helical compression spring 58 engages in a longitudinal groove 64 in the inlet valve stem 48 and the end of smaller diameter of the helical compression spring 58 is thereby held fast on the inlet valve stem 48 for rotation therewith.

At its end situated in the interior of the piston the inlet valve stem 48 is extended by a pin 66 as far as the transverse bore 40 of the piston 12.

For installation purposes the inlet valve body 50 is composed of two parts, comprising the inlet valve stem 48 and the inlet valve disk 46. Various possible connections joining the inlet valve disk 46 to the inlet valve stem 48 are illustrated as examples in FIGS. 2a, 2b, 3 and 4 and are explained below. For identical parts use is made of reference numerals corresponding to FIG. 1.

FIGS. 2a and 2b show an ultrasonic welding connection before welding (FIG. 2a) and during welding (FIG. 2b). Both the inlet valve disk 46 and the inlet valve stem 48 are made of a thermoplastic material in this embodiment of the invention. The inlet valve disk 46 has an axial bore 68, which is cylindrical over a short length and thereupon widens conically in the direction of a side facing away from the piston 12. The inlet valve disk 46 is pushed onto the inlet valve stem 48. The inlet valve stem 48 is substantially cylindrical in shape in the region onto which the inlet valve disk 46 is pushed on. In the insertion region it has circumferential beads 70 as welding projections.

From its end carrying the valve disk the inlet valve stem 48 is provided with an axial blind hole 72, the bottom of which is rounded.

The ultrasonic welding of the inlet valve disk 46 to the inlet valve stem 48 is illustrated in FIG. 2b: the conical tip 74 of a so-called sonotrode, that is to say a tool for ultrasonic welding, is introduced into the the blind hole 72 of the inlet valve stem 48 and excited to vibrate in the ultrasonic frequency range. The vibration may be torsional vibration. That end of the inlet valve stem 48 which is inserted into the inlet valve disk 46 is thereby conically expanded and comes to bear against the conically expanding part of the bore 68 in the inlet valve disk 46. Excitation to vibration using ultrasonic frequency leads to a relative movement between the inlet valve stem 48 and the inlet valve disk 46, and this movement brings about the welding of the two parts 46, 48 to one another. During the welding the inlet valve stem 48 is supported by means of its pin 66 against an arbor (not shown), which for this purpose is inserted into the transverse bore 40 of the piston 12 (FIG. 1, the piston is situated outside the cylinder 14 during welding).

In the embodiment illustrated in FIG. 3 the inlet valve disk 46 is thermoplastically riveted to the inlet valve stem 48. The inlet valve stem 48 is once again composed of a thermoplastic material, and the inlet valve disk 46 may likewise consist of a thermoplastic material; in the example described it is made of metal (steel). An axial bore in the inlet valve disk 46 narrows from the stem side in stepped form and thus forms an annular locating surface 76 for the inlet valve stem 48. From that point the bore 74 widens conically to receive a rivet head.

The inlet valve stem 48 merges integrally at its end on the valve disk side into a pin 78 which, when the inlet valve disk 46 has been fitted onto the inlet valve stem 48, projects out of said disk on the side facing away from the stem (dashed lines in FIG. 3). With the aid of a heated head-forming dolly (not shown) this pin is converted into a rivet head, whereby the inlet valve disk 46 and the inlet valve stem 48 are joined to form the inlet valve body 50. In the case of thermoplastic riveting the inlet valve stem 48 is also supported by means of its pin 66 against the arbor (not shown), which is inserted into the transverse bore 40 of the piston 12.

In the exemplary embodiment of the invention illustrated in FIG. 4 the inlet valve disk 46 is screwed to the inlet valve stem 48: the inlet valve stem 48 has in its end face a threaded blind bore 80, into which a countersunk screw 82 holding the valve disk 46 is screwed. As in the exemplary embodiment illustrated in FIG. 3, the inlet valve disk 46 is provided with a stepped axial bore 84, which has an annular locating surface 86 for the inlet valve stem 48 and a conical countersink 88, on the side facing away from the valve stem, to receive a screw head 90. The pairing of materials for the inlet valve disk 46 and the inlet valve stem 48 can be selected from a multiplicity of materials in the case of the screwed embodiment.

The one-piece design of the piston 12 makes it necessary to introduce the inlet valve body 50 together with the helical compression spring 58 into the longitudinal bore 38 of the piston 12 from the front end face. This is done in the following manner.

The helical compression spring 58 is first mounted on the inlet valve stem 48, which has not yet been joined to the inlet Valve disk 46, by inserting its end of smaller diameter into the constriction 56 of the inlet valve stem 48. No means preventing rotation between the inlet valve stem 48 and the helical compression spring 58 is required, because the helical compression spring is accessible from the front end face of the piston during installation in the piston 12 and therefore can be brought to bear against the annular shoulder 59 of the piston 12. In the examples described, security against rotation is nevertheless achieved in that the end part 62 at the end of smaller diameter of the helical compression spring 58 is bent over parallel to the axis and inserted into the longitudinal groove 64 of the inlet valve stem 48.

For the installation of the inlet valve a mandrel (not shown) is inserted through the transverse bore 40 of the piston 12, which has not yet been introduced into the cylinder 14, and thereupon the inlet valve stem 48 together with the helical compression spring 58 is introduced into the longitudinal bore 38 of the piston 12 from the front end face of the piston. Since the inlet valve disk 46 is not yet mounted on the inlet valve stem 48, the helical compression spring 58 is freely accessible from the front end face of the piston and can be brought to bear against the annular shoulder 59, against which it is supported. The helical compression spring 58 presses the inlet valve stem 48 into the interior of the piston and, by means of its pin 66, against the arbor (not shown), which has been inserted into the transverse bore 40 of the piston 12.

To make installation easier, the inwardly projecting flange 60 is provided in the exemplary embodiments with a snug 92

(FIGS. 2 and 3) projecting radially inwards or with an opening 94 in the form of a helical flute (FIG. 4). Turning the inlet valve stem 48 during its introduction into the longitudinal bore 38, with the helical compression spring 58 joined to and rotating with it, has the effect of bringing the helical compression spring 58 to bear against the projection 92 or into the opening 94, so that it is "screwed" into the longitudinal bore 38 until it has completely passed the flange 60 and bears against the annular shoulder 59 of the latter. The seating of the helical compression spring 58 against the flange 60 can be checked, and if necessary improved, as long as the inlet valve disk 46 has not yet been fitted.

As soon as the helical compression spring 58 has been inserted in the prescribed manner into the longitudinal bore 38, the inlet valve disk 46 can be joined to the inlet valve stem 48 as described in connection with FIGS. 2 to 4. By means of its pin 66 the inlet valve stem 48 is supported for that purpose against the arbor (not shown) inserted into the transverse bore 40 of the piston 12.

After the inlet valve disk 46 has been joined to the inlet valve stem 48, mandrel (not shown) is withdrawn from the transverse bore 40 of the piston 12, and the piston 12 can then be inserted into the cylinder 14.

The foregoing relates to preferred exemplary embodiments of the invention, it being understood that other variants and embodiments thereof are possible within the spirit and scope of the invention, the latter being defined by the appended claims.

We claim:

1. A hydraulic unit including a casing (20), a cylinder (14) in said casing, a piston (12) in said cylinder through which a fluid flows, a piston pump (10) having an inlet valve in the piston (12) along a longitudinal axis of the casing, the piston (12) having a longitudinal blind bore (38) along said axis which is in communication with a fluid inlet (42) in said casing and said cylinder and which leads out at a front end face of the piston via an inlet valve seat (44) and an inlet valve body (50) having an inlet valve stem (48) in the longitudinal blind bore (38) of the piston (12) and has a separate inlet valve disk (46) which is joined to said valve stem (48) and sealingly pressed against the inlet valve seat (44) by a prestressed inlet valve spring (58) which acts on the inlet valve stem (48) and is supported against an annular shoulder (59) in the longitudinal blind bore (38) of the piston (12), wherein the inlet valve stem (48) and the inlet valve disk (46) are joined to one another after the inlet valve spring (58) and the inlet valve stem (48) have been placed within the piston (12).

2. The piston as claimed in claim 1, wherein the inlet valve spring (58) is a conically coiled helical compression spring.

3. The piston as claimed in claim 1, wherein the inlet valve spring (58) is mounted on the inlet valve stem (48) for movement therewith.

4. The piston as claimed in clailm 2, wherein the inlet valve spring (58) is mounted on the inlet valve stem (48) for movement therewith.

5. The piston as claimed in claim 1, wherein the annular shoulder (59) in the longitudinal bore (38) of the piston (12) has at least one through opening (94).

6. The piston as claimed in claim 2, wherein the annular shoulder (59) in the longitudinal bore (38) of the piston (12) has at least one through opening (94).

7. The piston as claimed in claim 3, wherein the annular shoulder (59) in the longitudinal bore (38) of the piston (12) has at least one through opening (94).

8. The piston as claimed in claim 1, wherein the annular shoulder (59) in the longitudinal bore (38) of the piston (12) has at least one protuberance (92) projecting radially inwards.

9. The piston as claimed in claim 2, wherein the annular shoulder (59) in the longitudinal bore (38) of the piston (12) has at least one protuberance (92) projecting radially inwards.

10. The piston as claimed in claim 5, wherein the annular shoulder (59) in the longitudinal bore (38) of the piston (12) has at least one protuberance (92) projecting radially inwards.

11. The piston as claimed in claim 1, wherein each of the inlet valve stem (48) and the inlet valve disk (46) consists of a thermoplastic material.

12. The piston as claimed in claim 2, wherein each of the inlet valve stem (48) and the inlet valve disk (46) consists of a thermoplastic material.

13. The piston as claimed in claim 3, wherein each of the inlet valve stem (48) and the inlet valve disk (46) consists of a thermoplastic material.

14. The piston as claimed in claim 4, wherein each of the inlet valve stem (48) and the inlet valve disk (46) consists of a thermoplastic material.

15. The piston as claimed in claim 5, wherein each of the inlet valve stem (48) and the inlet valve disk (46) consists of a thermoplastic material.

16. The piston as claimed in claim 1, wherein the inlet valve disk (46) is welded or riveted to the inlet valve stem (48).

17. The piston as claimed in claim 2, wherein the inlet valve disk (46) is welded or riveted to the inlet valve stem (48).

18. The piston as claimed in claim 3, wherein the inlet valve disk (46) is welded or riveted to the inlet valve stem (48).

19. The piston as claimed in claim 5, wherein the inlet valve disk (46) is welded or riveted to the inlet valve stem (48).

20. The piston as claimed in claim 8, wherein the inlet valve disk (46) is welded or riveted to the inlet valve stem (48).

21. The piston as claimed in claim 11, wherein the inlet valve disk (46) is welded or riveted to the inlet valve stem (48).

22. The piston as claimed in claim 16, wherein the connection of the inlet valve disk (46) to the inlet valve stem (48) is a thermoplastic rivet connection.

23. The piston as claimed in claim 16, wherein the connection of the inlet valve disk (46) to the inlet valve stem (48) is an ultrasonic welded connection.

24. A method of producing a piston (12) as claimed in claim 1, wherein the inlet valve stem (48) together with the inlet valve spring (58) is inserted into the longitudinal blind bore (38) of the piston (12), and wherein thereupon the inlet valve disk (46) is fitted from the valve seat side onto the inlet valve stem (48) and joined to the latter.

25. A method as claimed in claim 24, wherein the inlet valve spring (58) is connected to the inlet valve stem (48) for rotation therewith, and wherein by turning the inlet valve stem (48) about its longitudinal axis during the insertion into the longitudinal blind bore (38) of the piston (12), the inlet valve spring (58) is brought into its position in which it is supported against the annular shoulder (59) in the longitudinal blind bore (38) of the piston (12) before the inlet valve disk (46) is fitted onto the inlet valve stem (48) and joined to the latter.

26. A hydraulic unit including a casing (20) a cylinder (14) in said casing, a piston (12) in said cylinder through which a fluid flows, a piston pump (10) having an inlet valve in the piston (12), the piston (12) having an axial longitudinal blind bore (38) which is shorter than said piston (12), at least one transverse bore (40) in said piston (12), said at least one transverse bore is in communication with a fluid inlet (42) and said at least one bore leads out of said piston at a front end face of the piston via an inlet valve seat (44) and an inlet valve body (50) having an inlet valve stem (48) in the longitudinal blind bore (38) of the piston (12) and has a separate inlet valve disk (46) which is joined to said valve stem (48) and sealingly pressed against the inlet valve seat (44) by a prestressed inlet valve spring (58) which acts on the inlet valve stem (48) and is supported against an annular shoulder (59) in the longitudinal blind bore (38) of the piston (12), wherein the inlet valve stem (48) and the inlet valve disk (46) are joined to one another after the inlet valve spring (48) and the inlet valve stem (48) have been placed within the piston (12).

* * * * *